United States Patent
Bastani et al.

(10) Patent No.: US 11,537,854 B2
(45) Date of Patent: Dec. 27, 2022

(54) PIPELINE WITH PROCESSOR INCLUDING NEURAL NETWORK FOR RENDERING ARTIFICIAL REALITY

(71) Applicant: Meta Platforms Technologies, LLC, Menlo Park, CA (US)

(72) Inventors: Behnam Bastani, Palo Alto, CA (US); Haomiao Jiang, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 401 days.

(21) Appl. No.: 16/678,287

(22) Filed: Nov. 8, 2019

(65) Prior Publication Data

US 2021/0142145 A1    May 13, 2021

(51) Int. Cl.
*G06N 3/04* (2006.01)
*G06T 19/00* (2011.01)
(Continued)

(52) U.S. Cl.
CPC ......... *G06N 3/049* (2013.01); *G02B 27/0172* (2013.01); *G06F 3/011* (2013.01); *G06F 3/017* (2013.01); *G06N 3/063* (2013.01); *G06N 3/08* (2013.01); *G06T 19/006* (2013.01); *G02B 2027/014* (2013.01)

(58) Field of Classification Search
CPC .............. G06F 2111/18; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

U.S. PATENT DOCUMENTS 5,847,718 A * 12/1998 Watson .................. H04N 5/262
                                                      345/162
2020/0175679 A1* 6/2020 Reiber .................... G06T 19/00
(Continued)

OTHER PUBLICATIONS

Bastani et al., "Foveated Pipeline for AR/VR Head-Mounted displays", Information Display, vol. 33, No. 6, Nov./Dec. 2017, pp. 14-35 (11 pages).
(Continued)

*Primary Examiner* — Todd Buttram
(74) *Attorney, Agent, or Firm* — Foley & Lardner LLP

(57) ABSTRACT

Disclosed herein are related to a system and a method for providing an artificial reality. In one aspect, a system includes a shared physical memory and a first processor having access to the shared physical memory. In one aspect, the first processor performs, during a first time period, a first rendering process to generate a first image frame of a first view of an artificial reality. In one aspect, the first processor performs, during a second time period, a second rendering process to generate a second image frame of a second view of the artificial reality. In one aspect, the system includes a second processor including a neural network and having access to the shared physical memory. In one aspect, the second processor performs, during a third time period overlapping a portion of the second time period, an image enhancing process on the first image frame.

20 Claims, 7 Drawing Sheets

(51) Int. Cl.
*G02B 27/01* (2006.01)
*G06N 3/08* (2006.01)
*G06F 3/01* (2006.01)
*G06N 3/063* (2006.01)

(56) References Cited

U.S. PATENT DOCUMENTS

2020/0234501 A1* 7/2020 Rodriguez .............. G06F 3/147
2020/0395047 A1* 12/2020 Vaquero ............. H04N 21/4667
2021/0142145 A1* 5/2021 Bastani .............. G02B 27/0093

OTHER PUBLICATIONS

Chen et al., "Learning to See in the Dark", In Proceedings of the IEEE Conference on Computer Vision and Pattern Recognition, May 4, 2018, pp. 3291-3300 (10 pages).

Dong et al., "Learning a Deep Convolutional Network for Image Super-Resolution", In European Conference on Computer Vision, Springer, Cham, 2014, pp. 184-199.

Evangelakos et al., "Extended TimeWarp Latency Compensation for Virtual Reality", In Proceedings of the 20th ACM SIGGRAPH Symposium on Interactive 3D Graphics and Games, Feb. 26-28, 2016, pp. 193-194 (2 pages).

Gatys et al., "Image Style Transfer Using Convolutional Neural Networks", Proceedings of the IEEE conference on Computer Vision and Pattern Recognition, 2016, pp. 2414-2423.

Gharbi et al., "Deep Bilateral Learning for Real-Time Image Enhancement", ACM Transactions on Graphics (TOG), vol. 36, No. 4, Aug. 22, 2017, pp. 118:1-118:12.

Gharbi et al., "Deep Joint Demosaicking and Denoising", ACM Transactions on Graphics (TOG), vol. 35, No. 6, Nov. 2016, pp. 191:1-191:12.

Heide et al., "FlexISP: A Flexible Camera Image Processing Framework", ACM Transactions on Graphics (TOG), vol. 33, No. 6, Article 231, Nov. 2014, pp. 231:1-231:13.

Jiang et al., "Learning the image processing pipeline", IEEE Transactions on Image Processing, vol. 26, No. 10, May 30, 2016, pp. 5032-5042 (10 pages).

Kim et al., "Accurate Image Super-Resolution Using Very Deep Convolutional Networks", In Proceedings of the IEEE Conference on Computer Vision and Pattern Recognition, Nov. 11, 2016, pp. 1646-1654 (9 pages).

Patney et al., "Towards Foveated Rendering for Gaze-Tracked Virtual Reality", ACM Transactions on Graphics (TOG), vol. 35, No. 6, Nov. 2016, pp. 179:2-179:12.

Shi et al., "Real-Time Single Image and Video Super-Resolution Using an Efficient Sub-Pixel Convolutional Neural Network", In IEEE Conference on Computer Vision and Pattern Recognition (CVPR), Sep. 23, 2016, pp. 1874-1883 (10 pages).

* cited by examiner

PIPELINE WITH PROCESSOR INCLUDING NEURAL NETWORK FOR RENDERING ARTIFICIAL REALITY

FIELD OF DISCLOSURE

The present disclosure is generally related to processing an image frame of an artificial reality, including but not limited to pipelining two or more processes with at least one processor that includes a neural network for generating an image frame of the artificial reality.

BACKGROUND

Artificial reality such as a virtual reality (VR), an augmented reality (AR), or a mixed reality (MR) provides immersive experience to a user. In one example, a user wearing a head mounted display (HMD) can turn the user's head, and an image frame of a virtual object corresponding to a location and an orientation of the HMD and/or a gaze direction of the user can be displayed on the HMD to allow the user to feel as if the user is moving within a space of an artificial reality (e.g., a VR space, an AR space, or a MR space).

In one implementation, determining a location and an orientation of the HMD and/or a gaze direction of the user, and presenting an image frame of the artificial reality involve complex processes. In one example, the HMD includes various sensors that generate sensor measurements for estimating and detecting a location and an orientation of the HMD and/or a gaze direction of the user wearing the HMD. According to the sensor measurements, a user's view of the space of the artificial reality can be estimated, and an image frame of the estimated view can be generated. While or after the image frame is generated, the location, the orientation and/or the gaze direction can be determined or updated according to the sensor measurements. According to the updated location and the orientation of the HMD and/or the gaze direction of the user, an updated or modified view of the space of the artificial reality can be determined. Moreover, reprojection based on one or more previous image frames can be performed to modify the image frame to reflect the updated or modified view of the space of the artificial reality, and the modified image frame can be presented to the user.

In one aspect, various processes of detecting the location and the orientation of the HMD and/or the gaze direction of the user wearing the HMD and presenting the image frame to the user should be performed within a frame time (e.g., less than 11 ms) to provide a seamless experience. Any latency between a movement of the user wearing the HMD and the image frame displayed corresponding to the user movement can cause judder, which may result in motion sickness and can degrade the user experience.

SUMMARY

Various embodiments disclosed herein are related to a system for providing an artificial reality. In some embodiments, the system includes a shared physical memory and a first processor having access to the shared physical memory. In some embodiments, the first processor is configured to perform, during a first time period, a first rendering process to generate a first image frame of a first view of an artificial reality. The first rendering process may include a rendering process (e.g., including at least a tiling process or a shading process). In some embodiments, the first processor is configured to perform, during a second time period after the first time period, a second rendering process to generate a second image frame of a second view of the artificial reality. The second rendering process may include another rendering process (e.g., at least another tiling process or another shading process). In some embodiments, the system includes a second processor including a neural network and having access to the shared physical memory. In some embodiments, the second processor is configured to perform, during a third time period overlapping a portion of the second time period, an image enhancing process on the first image frame to generate a first modified image frame. The image enhancing process may include for instance a super resolution on a portion of the first image frame. In some embodiments, the first processor is a graphics processor, and the second processor is a digital signal processor or a neural processor (e.g., neural processing unit).

In some embodiments, the first processor is configured to determine a view of the artificial reality corresponding to at least a location and an orientation of the system. In some embodiments, the first processor is configured to perform, during a fourth time period after the second time period, reprojection on the first modified image frame to generate a first reprojected image frame, according to the determined view of the artificial reality. In some embodiments, the system includes a lens. The first processor may be configured to apply, during the fourth time period, a predistortion on the first reprojected image frame to generate a first compensated image frame to compensate for an optical aberration due to the lens. In some embodiments, the system includes an electronic display configured to display the first compensated image frame through the lens. In some embodiments, the system includes a third processor configured to determine, during a fourth time period before the first time period, the first view of the artificial reality corresponding to at least a first location and a first orientation of the system, and determine, during a fifth time period overlapping a portion of the first time period, the second view of the artificial reality corresponding to at least a second location and a second orientation of the system.

In some embodiments, the image enhancing process includes a super resolution. In some embodiments, the second processor is configured to perform, during the third time period, the super resolution on a portion of the first image frame by enlarging the portion of the first image frame. In some embodiments, the portion of the first image frame corresponds to a foveated area. In some embodiments, the first processor is configured to generate the first image frame in a linear format, in response to a size of the foveated area being less than a threshold. In some embodiments, the first processor is configured to generate the first image frame in a swizzled format, in response to a size of the foveated area being larger than a threshold. In some embodiments, the system further includes a converter configured to convert the first image frame in the swizzled format into a linear format. In some embodiments, the first processor is configured to store the first image frame in the shared physical memory, and to provide or share mapping information indicating an address of the shared physical memory storing the first image frame. In some embodiments, the second processor is configured to access the first image frame in the shared physical memory according to the mapping information.

Various embodiments disclosed herein are related to a method for providing an artificial reality. In some embodiments, the method includes performing, during a first time period, by a first processor having access to a shared physical memory, a first rendering process to generate a first image frame of a first view of an artificial reality. The first rendering process may include at least a tiling process or a shading process. In some embodiments, the method includes performing, during a second time period after the first time period, by the first processor, a second rendering process to generate a second image frame of a second view of the artificial reality. The second rendering process may include at least another tiling process or another shading process. In some embodiments, the method includes performing, during a third time period overlapping a portion of the second time period, by a second processor having access to the shared physical memory and including a neural network, an image enhancing process on the first image frame to generate a first modified image frame. The image enhancing process may for example include a super resolution on a portion of the first image frame. In some embodiments, the first processor is a graphics processor, and the second processor is a digital signal processor or a neural processor.

In some embodiments, the method includes determining, by the first processor, a view of the artificial reality corresponding to at least a location and an orientation of a head mounted display worn by a user of the artificial reality. In some embodiments, the method includes performing, during a fourth time period after the second time period, by the first processor, reprojection on the first modified image frame to generate a first reprojected image frame, according to the determined view of the artificial reality. In some embodiments, the method includes applying, during the fourth time period, by the first processor, a predistortion on the first reprojected image frame to generate a first compensated image frame to compensate for an optical aberration due to a lens, and displaying, by an electronic display through the lens, the first compensated image frame.

In some embodiments, the method includes determining, during a fourth time period before the first time period, by a third processor, the first view of the artificial reality corresponding to at least a first location and a first orientation of a head mounted display and, generating, during a fifth time period overlapping a portion of the first time period, by the third processor, the second view of the artificial reality corresponding to at least a second location and a second orientation of the head mounted display. In some embodiments, the image enhancing process includes a super resolution. In some embodiments, the method includes performing, during the third time period, the super resolution on a portion of the first image frame to enlarge the portion of the first image frame. In some embodiments, the portion of the first image frame corresponds to a foveated area. In some embodiments, the method further includes comparing a size of the foveated area against a threshold, and generating, by the first processor, the first image frame in a linear format, in response to the size of the foveated area being less than the threshold.

In some embodiments, the method includes comparing a size of the foveated area against a threshold. In some embodiments, the method includes generating, by the first processor, the first image frame in a swizzled format, in response to the size of the foveated area being larger than the threshold. In some embodiments, the method includes converting, by a converter, the first image frame in the swizzled format into a linear format.

Various embodiments disclosed herein are related to a system for an artificial reality. In some embodiments, the system includes a first processor having access to a shared physical memory. In some embodiments, the first processor is configured to perform, during a first time period, a first rendering process to generate a first image frame of a first view of an artificial reality. The first rendering process may for instance include at least a tiling process or a shading process. In some embodiments, the first processor is configured to perform, during a second time period after the first time period, a second rendering process to generate a second image frame of a second view of the artificial reality. The second rendering process may for example include at least another tiling process or another shading process. In some embodiments, the system includes a second processor having access to the shared physical memory and including a neural network. In some embodiments, the second processor is configured to begin, prior to or when the first processor performs the second rendering process to generate the second image frame of the second view of the artificial reality, an image enhancing process on the first image frame to generate a first modified image frame. In some embodiments, the first processor is a graphics processor, and the second processor is a digital signal processor or a neural processor.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
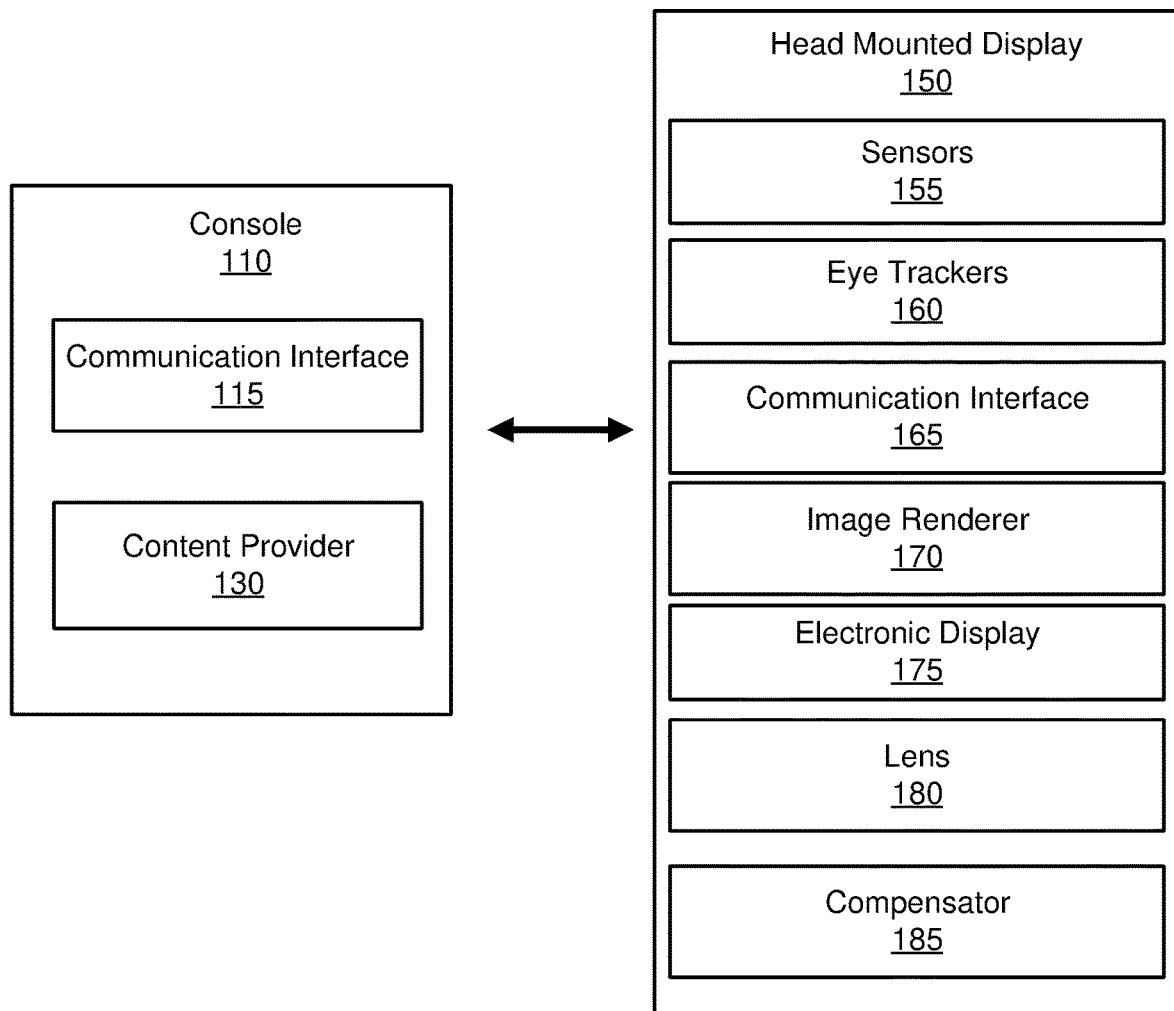
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for pipelining two or more processes with at least one processor including (e.g., having or implementing) a neural network for generating an image frame of an artificial reality. In one aspect, a system includes a shared physical memory, and at least a first processor and a second processor. The first processor and the second processor can access the shared physical memory. In one aspect, the first processor is configured to perform, during a first time period, a first rendering process to generate a first image frame of a first view of the artificial reality. In one aspect, the first processor is configured to perform, during a second time period after the first time period, a second rendering process to generate a second image frame of a second view of the artificial reality. In one aspect, the second processor includes a neural network. The second processor may be configured to perform, during a third time period, an image enhancing process on the first image frame to generate a first modified image frame. The third time period may overlap with a portion of the second time period. Examples of the first rendering process and the second rendering process include a tiling process, a shading process, etc., whereas examples of the image enhancing process can include performing a super resolution on a foveated area.

Advantageously, the disclosed system and method can perform real time graphics processing (e.g., frame rates higher than 60 fps or 90 fps) while conserving computational resources (e.g., processing speed and/or storage amount) and achieving power efficiency by pipelining various processes with the first processor and the second processor. The first processor may include a central processing unit (CPU) or a graphics processing unit (GPU), whereas the second processor can include a digital signal processor or a neural processing unit (NPU). In one aspect, the second processor includes a neural network that can execute one or more processes more efficiently (e.g., three to 10 times) than the first processor. By allocating the one or more processes that the second processor can efficiently handle to the second processor while the first processor performs a part of a different process, a complex series of processes for detecting the location and the orientation of the system and/or the gaze direction of the user wearing the system and presenting the image frame of a view of the artificial reality corresponding to the detected location and the orientation of the system and/or the gaze direction of the user can be performed with high frame rate (e.g., 60 fps or 90 fps) within a frame time or duration (e.g., less than 11 ms) with reduced power consumption and/or reduced computational resources.

In one aspect, the disclosed system is a mobile device (e.g., HMD), where the first processor and the second processor (and possibly other/all processors) have access to the shared physical memory. For example, the first processor generates an image frame, and stores the image frame by the shared physical memory. The first processor may also store, share, communicate and/or provide mapping information indicating an address of the shared physical memory storing the image frame. The second processor may access the image frame according to the mapping information (e.g., via communication with the first processor, or by accessing a storage location with the mapping information), and perform an image enhancing process on the image frame to generate a modified image frame. In one aspect, different processors can access data through the shared physical memory faster and/or more efficiently by obviating copying or replicating data stored by different memory devices.

FIG. 1 is a block diagram of an example artificial reality system environment 100 in which a console 110 and a HMD 150 operating together to present artificial reality to a user wearing the HMD 150. In one aspect, the HMD 150 may detect its location and an orientation, and/or a gaze direction of the user wearing the HMD 150, and provide the detected location, the orientation, and/or the gaze direction to the console 110. The console 110 may determine a view within the space of the artificial reality corresponding to the detected location, the orientation, and/or the gaze direction, and generate an image depicting the determined view. The console 110 may provide the image to HMD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HMD 150. For example, some of the functionality of the HMD 150 may be performed by the console 110. In some embodiments, the console 110 is integrated as part of the HMD 150.

In some embodiments, the HMD 150 is an electronic component that can be worn by a user and can present or provide an artificial reality experience to the user. The HMD 150 may render one or more images, video, audio, or some combination thereof to provide the artificial reality experience to the user. In some embodiments, audio is presented via an external device (e.g., speakers and/or headphones) that receives audio information from the HMD 150, the console 110, or both, and presents audio based on the audio information. In some embodiments, the HMD 150 includes sensors 155, eye trackers 160, a communication interface 165, an image renderer 170, an electronic display 175, a lens 180, and a compensator 185. These components may operate together to detect a location and an orientation of the HMD 150 and/or a gaze direction of the user wearing the HMD 150, and render an image of a view of the artificial reality corresponding to the detected location and the orientation of the HMD 150 and/or the gaze direction of the user. In other embodiments, the HMD 150 includes more, fewer, or different components than shown in FIG. 1.

In some embodiments, the sensors 155 include electronic components or a combination of electronic components and software components that detect a location and an orientation of the HMD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HMD 150. In one aspect, the sensors 155 can detect the translational movement and the rotational movement with respect to a previous orientation and/or location of the HMD 150, and determine a new orientation and/or location of the HMD 150 by accumulating or integrating the detected translational movement and/or the rotational movement. Assuming for an example that the HMD 150 is oriented in a direction 25 degrees from a reference direction, in response to detecting that the HMD 150 has rotated 20 degrees, the sensors 155 may determine that the HMD 150 now faces or is oriented in a direction 45 degrees from the reference direction. Assuming for another example that the HMD 150 was located two feet away from a reference point in a first direction, in response to detecting that the HMD 150 has moved three feet in a second direction, the sensors 155 may determine that the HMD 150 is now located at a vector multiplication of the two feet in the first direction and the three feet in the second direction.

In some embodiments, the eye trackers 160 include electronic components or a combination of electronic components and software components that determine a gaze direction of the user of the HMD 150. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HMD 150, according to the determined angular rotation, translation and/or the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HMD 150. In some embodiments, the eye trackers 160 incorporate the orientation of the HMD 150 and/or the relative gaze direction with respect to the HMD 150 to determine a gate direction of the user. Assuming for an example that the HMD 150 is oriented at a direction 30 degrees from a reference direction, and the relative gaze direction of the HMD 150 is −10 degrees (or 350 degrees) with respect to the HMD 150, the eye trackers 160 may determine that the gaze direction of the user is 20 degrees from the reference direction. In some embodiments, a user of the HMD 150 can configure the HMD 150 (e.g., via user settings) to enable or disable the eye trackers 160. In some embodiments, a user of the HMD 150 is prompted to enable or disable the eye trackers 160.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In the embodiments, in which the console 110 and the head mounted display 150 are implemented on a single system, the communication interface 165 may communicate with the console 110 through a bus connection or a conductive trace. Through the communication link, the communication interface 165 may transmit to the console 110 data indicating the determined location and the orientation of the HMD 150 and/or the determined gaze direction of the user. Moreover, through the communication link, the communication interface 165 may receive from the console 110 data indicating or corresponding to an image to be rendered.

In some embodiments, the image renderer 170 includes an electronic component or a combination of an electronic component and a software component that generates one or more images for display, for example, according to a change in view of the space of the artificial reality. The image renderer 170 may receive, through the communication interface 165, data describing an image to be rendered, and render the image through the electronic display 175. In some embodiments, the data from the console 110 may be compressed or encoded, and the image renderer 170 may decompress or decode the data to generate and render the image. In one aspect, the image renderer 170 receives the compressed image from the console 110, and decompresses the compressed image, such that a communication bandwidth between the console 110 and the HMD 150 can be reduced. In some embodiments, the image renderer 170 is implemented as two or more processors that execute instructions to perform various functions in a pipelined manner as described herein. For example, the image renderer 170 includes a first processor that executes a first process on a first image frame during a first time period and executes a second process on a second image frame during a second time period. The image renderer 170 may also include a second processor employing a machine learning neural network that executes a third process on a portion of the output of the first process during a third time period, where the third time period overlaps with at least a portion of the second time period. Because the second processor includes a neural network that can perform the third process more efficiently and/or effectively than the first processor, various complex processes for detecting the location and the orientation of the HMD 150 and/or the gaze direction of the user wearing the HMD 150, for performing game-related or other activity related operations (e.g., physics, game logic, inputs handling), for performing graphics-related and/or rendering related operations (e.g., culling, computing matrices, sending GPU commands), for performing graphics rendering and/or image related operations (e.g., tiling, rasterizing, shading, resolving), for performing reprojection related operations (e.g., time/space warp, lens distortion compensation or removal, scaling), and/or presenting a high resolution image (e.g., 1920 by 1080 pixels, or 2048 by 2048 pixels) corresponding to the detected location, the orientation, and/or the gaze direction to the HMD 150, can be performed within a frame time (e.g., less than 11 ms) through a pipelining configuration as disclosed herein. A frame time can refer to an image refresh time, duration or cycle. A frame time or duration can refer to a duration for which each image frame is rendered, e.g., before being removed or replaced by a next image frame.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HMD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HMD 150. In one aspect, the console 110 includes a communication interface 115 and a content provider 130. These components may operate together to determine a view (e.g., a FOV of the user) of the artificial reality corresponding to the location and the orientation of the HMD 150 and/or the gaze direction of the user of the HMD 150, and can generate an image of the artificial reality corresponding to the determined view. In other embodiments, the console 110 includes more, fewer, or different components than shown in FIG. 1. In some embodiments, the console 110 is integrated as part of the HMD 150.

In some embodiments, the communication interface 115 is an electronic component or a combination of an electronic component and a software component that communicates with the HMD 150. The communication interface 115 may be a counterpart component to the communication interface 165 to communicate with a communication interface 115 of the console 110 through a communication link (e.g., USB cable). Through the communication link, the communication interface 115 may receive from the HMD 150 data indicating the determined location and the orientation of the HMD 150 and/or the determined gaze direction of the user. Moreover, through the communication link, the communication interface 115 may transmit to the HMD 150 data describing an image to be rendered.

The content provider 130 is a component that generates content to be rendered according to the location and the orientation of the HMD 150 and/or the gaze direction of the user of the HMD 150. In one aspect, the content provider 130 determines a view of the artificial reality according to the location and the orientation of the HMD 150 and/or the gaze direction of the user of the HMD 150. For example, the content provider 130 maps the location of the HMD 150 in a physical space to a location within a virtual space, and determines a view of the virtual space along the gaze direction from the mapped location in the virtual space. The content provider 130 may generate image data describing an image of the determined view of the virtual space, and transmit the image data to the HMD 150 through the communication interface 115. In some embodiments, the content provider 130 generates metadata including motion vector information, depth information, edge information, object information, etc., associated with the image, and transmits the metadata with the image data to the HMD 150 through the communication interface 115. The content provider 130 may compress and/or encode the data describing the image, and can transmit the compressed and/or encoded data to the HMD 150.

Figure 2:
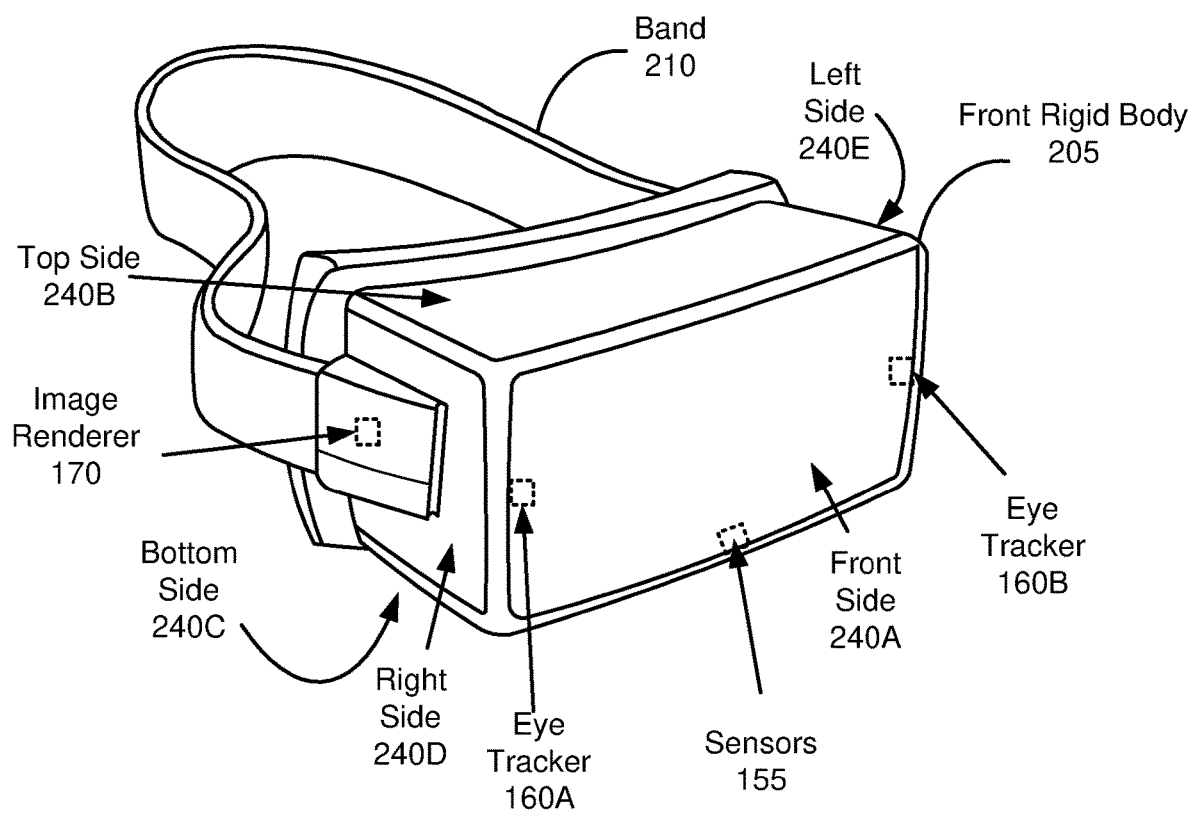
FIG. 2 is a diagram of a head mounted display, according to an example implementation of the present disclosure.

FIG. 2 is a diagram of a HMD 150, in accordance with an example embodiment. In some embodiments, the HMD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, and the image renderer 170. In the embodiment shown by FIG. 2, the sensors 155 are located within the front rigid body 205, and may not visible to the user. In other embodiments, the HMD 150 has a different configuration than shown in FIG. 2. For example, the image renderer 170, the eye trackers 160A, 160B, and/or the sensors 155 may be in different locations than shown in FIG. 2.

Figure 3:
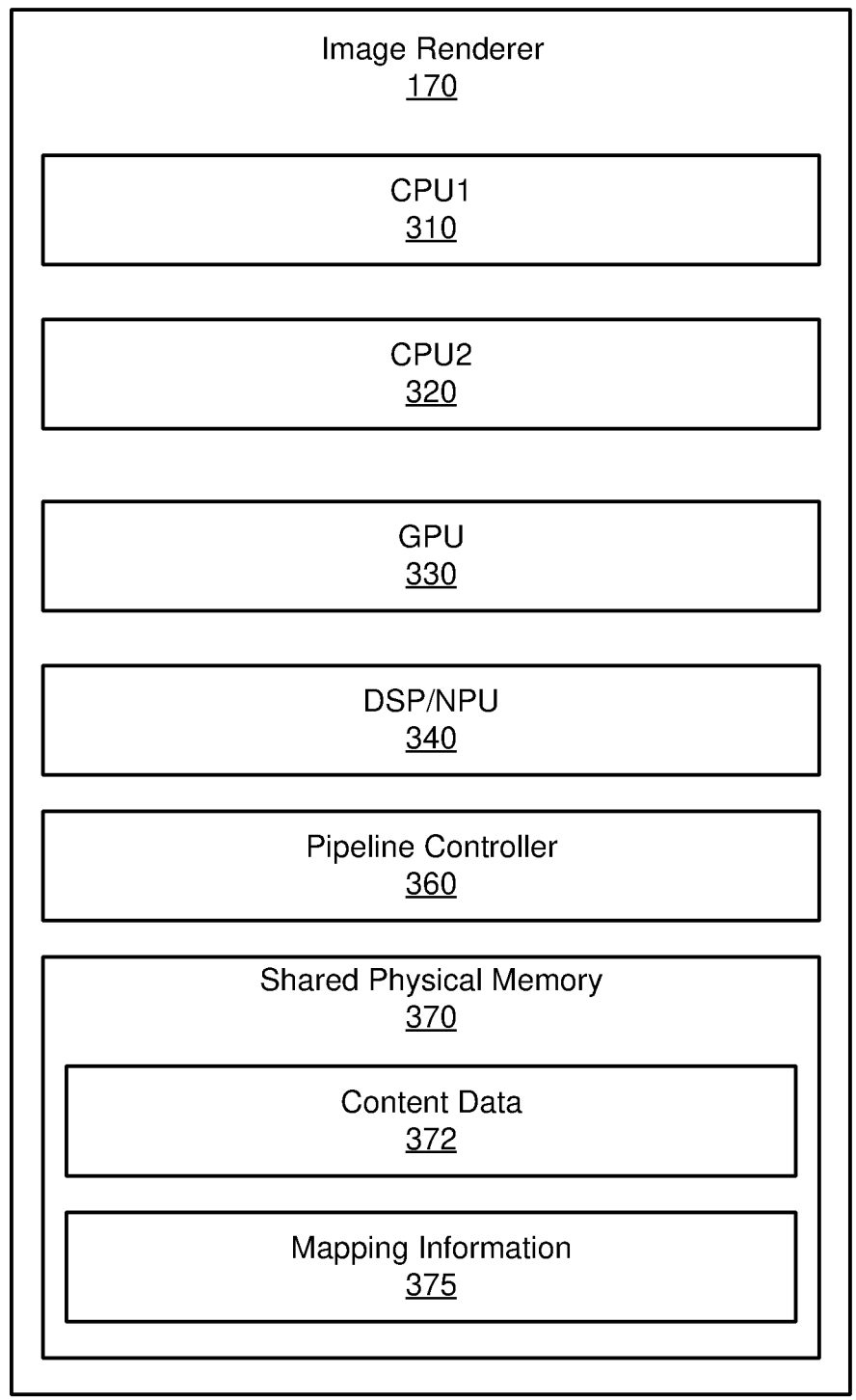
FIG. 3 is a diagram of an image renderer, according to an example implementation of the present disclosure.

FIG. 3 is a diagram of an image renderer 170 (e.g., the image renderer 170 of FIG. 1), according to an example implementation of the present disclosure. In some embodiments, the image renderer 170 includes a CPU1 310, a CPU2 320, a GPU 330, a DSP/NPU 340, a pipeline controller 360, and a shared physical memory 370. These components may operate together to perform various processes to render images of an artificial reality in a pipelined configuration. In one aspect, the DSP/NPU 340 includes a neural network that can perform certain processes much faster, more effectively and/or more efficiently than the CPU1 310, CPU2 320, GPU 330. In some embodiments, the image renderer 170 is implemented as hardware or a combination of hardware and software. In some embodiments, the image renderer 170 includes more, fewer, or different components than shown in FIG. 3. For example, the image renderer 170 includes different types of processors than shown in FIG. 3. In some embodiments, various processes performed by the CPU1 310, the CPU2 320, the GPU 330, and/or the DSP/NPU 340 are performed by different processors.

In some embodiments, the CPU1 310 performs processes for handling input commands and estimating a view of an artificial reality. The CPU1 310 may be communicatively coupled to one or more sensors 155. In one example, the CPU1 310 obtains an initial estimate of location and orientation of the HMD 150 from the sensors 155, and estimates a corresponding view within a space of the artificial reality according to the location and orientation of the HMD 150. The CPU1 310 may also process input commands from a user or detect any events within the artificial reality, and apply corresponding effects to the artificial reality. For example, the CPU1 310 detects an interaction of the user with a physical object or a virtual object, and applies a corresponding effect to the artificial reality (e.g., an action or a setting within a virtual reality game) according to the user interaction. The CPU1 310 may perform simulations based on a physics engine to estimate the view within the space of the artificial reality.

In some embodiments, the CPU2 320 performs processes (such as generating commands) for rendering. The CPU2 320 may be communicatively coupled between the CPU1 310 and the GPU 330. In one example, the CPU2 320 may receive the estimated view within the space of the artificial reality, and may compute matrices describing the view. The CPU2 320 may also perform a culling to select or filter images frames. The CPU2 320 may generate and/or execute/handle commands for the GPU 330 to generate image frames based on the computed matrices.

In some embodiments, the GPU 330 performs rendering processes for graphics rendering (e.g., sometimes collectively or individually referred to as graphics rendering process(es) or image rendering process(es)). The GPU 330 may perform rendering processes according to the commands from the CPU2 320. The GPU 330 may be communicatively coupled between the CPU2 320 and the DSP/NPU 340. In one example, the GPU 330 performs tiling on an image frame to divide the image frame into a plurality of tiles or tile-like regions, and performs rasterizing and/or shading on the image frame per tile. In one aspect, performing rasterizing and/or shading per tile can reduce computation resources (e.g., amount of processing, and/or storage amount) compared to performing rasterizing and/or shading on the full image frame. In one example, the GPU 330 identifies one or more tiles of the image frame corresponding to a foveated area, according to the estimated view of the artificial reality. In one aspect, the GPU 330 may also perform resolving.

In some embodiments, the GPU 330 adaptively changes or alters a format of data of files processed. In one aspect, the GPU 330 can generate an image frame in a first format (e.g., a swizzled format) or a second format (e.g., a linear format), but may process or generate the image frame in the first format faster or more efficiently than the image frame in the second format. Meanwhile, the DSP/NPU 340 may process an image frame in the second format (e.g., linear format) but not in the first format. The GPU 330 may compare a size of the foveated area against a threshold to adaptively change a format of data or files processed. In response to the size of the foveated area being less than the threshold, the GPU 330 may generate the image frame or the portion of the image frame in the second format (e.g., linear format) that the DSP/NPU 340 can process. In response to the size of the foveated area being larger than a threshold, the GPU 330 may generate the image frame or the portion of the image frame in the first format (e.g., swizzled format) that the DSP/NPU 340 may not process. In one approach, the image renderer 170 includes a converter coupled between the GPU 330 and the DSP/NPU 340 that can convert the image frame or the portion of the image frame in the first format into the second format to allow the DSP/NPU 340 to process.

In some embodiments, the DSP/NPU 340 performs image enhancing processes (e.g., super resolution) for improving, enhancing, or modifying an image frame from the GPU 330. Image enhancing processes are sometimes collectively or individually referred to as graphics enhancing process(es) or image enhancing process(es). In one implementation, the DSP/NPU 340 includes a machine learning neural network, and may be communicatively coupled to the GPU 330. In one aspect, the neural network can perform specialized processes more efficiently, for example, at least three (or some other number of) times, than other components (e.g., CPU1 310, CPU2 320, GPU 330). In one example, the DSP/NPU 340 performs super resolution on a portion of the image frame. The DSP/NPU 340 may perform super resolution on the foveated area of the image frame via the neural network to increase a size or a number of pixels in the foveated area. The foveated area may be a predetermined region in the image frame (e.g., near a center of the image frame), or may be adaptively determined according to a gaze direction of the user. In one example, the neural network may perform convolutions on the foveated area to increase the size or the number of pixels in the foveated area. The DSP/NPU 340 may blend edges, sides or boundaries of the output of the neural network with a non-foveated area of the image frame to obtain a modified image frame. The DSP/NPU 340 may also perform artifact removal or other processes on the image frame to obtain a modified image frame via the neural network.

In some embodiments, the GPU 330 receives the modified image frame from the DSP/NPU 340, and performs additional processes on the modified image frame for displaying. In one aspect, the updated location and the orientation of the HMD 150, and/or the gaze direction of the user of the HMD 150 may be determined according to the sensors 155. The GPU 330 may receive information indicating an updated view of the artificial reality corresponding to the updated location and the orientation of the HMD 150, and/or the gaze direction of the user, and can perform reprojection on the modified image frame to obtain a reprojected image frame. For example, the GPU 330 may perform time warp and/or space warp to update the modified image frame according to the rotation and/or shift in the view of the artificial reality. The GPU 330 may generate a small portion of the reprojected image frame corresponding to the updated view, and stitch or append the small portion of the reprojected image frame to the modified image frame to generate the reprojected image frame. When performing reprojection, the GPU 330 may reuse portions of one or more previous image frames to conserve computational resources. Hence, the GPU 330 can generate the reprojected image frame reflecting the updated view of the artificial reality in a prompt and/or computationally efficient manner. In some embodiments, the GPU 330 performs predistortion on the reprojected image to compensate for optical aberrations or distortions due to the lens 180, and presents the predistorted image through the electronic display 175. In some embodiments, the GPU 330 performs any type or form of scaling (e.g., image scaling) on the compensated/modified/reprojected image.

The pipeline controller 360 includes or corresponds to a component that schedules, assigns, allocates, manages, coordinates and/or controls various processes for rendering an image of an artificial reality in a pipeline configuration. In one example, the pipeline controller 360 includes a processor and a non-transitory computer readable medium storing instructions when executed by the processor cause the processor to schedule, allocate or assign processes to the CPU1 310, the CPU2 320, the GPU 330, the DSP/NPU 340 in a pipeline configuration. For example, the pipeline controller 360 schedules the CPU1 310 to perform processes to handle input commands and estimate a first view of an artificial reality during a first time period, and schedules the CPU2 320 to perform processes to generate commands for rendering a first image of the first view of the artificial reality during a second time period after the first time period. The pipeline controller 360 may also schedule the GPU 330 to perform rendering processes for graphics rendering according to the commands from the CPU2 320 to generate the first image frame of the first view of the artificial reality during a third time period (e.g., after the second time period), schedule the DSP/NPU 340 to perform image enhancing processes for improving or modifying the first image frame during a fourth time period (e.g., after the third time period), and schedule the GPU 330 to perform additional processes on the first modified image frame for displaying during a fifth time period (e.g., after the fourth time period).

The pipeline controller 360 may also schedule the CPU1 310, the CPU2 320, the GPU 330, the DSP/NPU 340 to perform additional processes for a second view of the artificial reality during time periods that may wholly or partially overlap with some of the time periods for the first image frame. In one example, the pipeline controller 360 schedules the CPU1 310 to perform additional processes to handle input commands and estimate a second view of the artificial reality during a time period partially or wholly overlapping the second time period, and schedules the CPU2 320 to perform additional processes to generate commands for rendering a second image frame of the second view of the artificial reality during a time period partially or wholly overlapping the third time period. The pipeline controller 360 may also schedule the GPU 330 to perform additional rendering processes for graphics rendering according to the commands from the CPU2 320 to generate the second image frame of the second view of the artificial reality during a time period partially or wholly overlapping the fourth time period, and schedule the DSP/NPU 340 to perform additional image enhancing processes for improving or modifying the second image frame during a time period after the GPU 330 completes the additional processes for the second image frame. The pipeline controller 360 may schedule the GPU 330 to perform additional processes on the second modified image frame for displaying during a time period after the DSP/NPU 340 completes the additional specialized processes for the second image frame. Additional descriptions on an example of pipelining the processes among the CPU1 310, the CPU2 320, the GPU 330, the DSP/NPU 340 are provided below with respect to FIG. 4.

In some embodiments, the pipeline controller 360 schedules the processes among the CPU1 310, the CPU2 320, the GPU 330, the DSP/NPU 340 according to the priorities or rankings of the processes within a frame time (e.g., 11 ms). For example, each output image frame (or each predistorted image frame) is rendered at a beginning of a corresponding frame time or a vertical synchronization (VSYNC). The pipeline controller 360 may prioritize the processes (e.g., reprojection and/or predistortion) for displaying an image frame over the processes (e.g., tiling, shading and/or rasterizing) for graphics rendering of a subsequent image frame according to the commands from the CPU2 320, such that the output image frame can be presented at an acceptable time or within an acceptable time window (e.g., at the VSYNC). If the processes (e.g., tiling, shading and/or rasterizing) for graphics rendering of the N+1th image frame are incomplete by a start of a reserved time period (e.g., 3 ns) before the VSYNC, for instance, the pipeline controller 360 may cause the GPU 330 to pause the processes for graphics rendering of the N+1th image frame during the reserved time period before the VSYNC. During the reserve time period, the pipeline controller 360 may schedule the GPU 330 to perform processes (e.g., reprojection and/or predistortion) for rendering and displaying the Nth image frame. The pipeline controller 360 may schedule the GPU 330 to resume and complete the processes (e.g., tiling, shading and/or rasterizing) for the graphics rendering of the N+1th image frame after the VSYNC. The pipeline controller 360 may estimate time periods for performing various processes by corresponding components, and schedule time periods according to the estimated time periods. Alternatively or additionally, the pipeline controller 360 may adaptively adjust time periods according to whether a certain process is completed or not during its scheduled time period. For example, in case certain processes (e.g., tiling, shading and/or rasterizing) for an image frame is not completed before a time period for additional processes (e.g., reprojection and/or predistortion) for a preceding image frame, the pipeline controller 360 may prioritize the additional processes (e.g., reprojection and/or predistortion) for the preceding frame during the time period, and reschedule remaining ones of the certain processes to be performed after the time period.

In some embodiments, data is stored and shared among two or more of the CPU1 310, the CPU2 320, the GPU 330, and the DSP/NPU 340. In one implementation, the image renderer 170 is implemented as a mobile computing device with the CPU1 310, the CPU2 320, the GPU 330, and the DSP/NPU 340 having or sharing access to the shared physical memory 370. In one example, the shared physical memory 370 stores content data 372 and mapping information 375 indicating address of the content data 372 (e.g., pointer or physical memory address where the content data 372 is stored). Content data 372 may be input commands, information indicating location and orientation of the HMD 150, the gaze direction of the user, a view of the virtual reality, image frames, processed image frames, reprojected image frames, predistorted image frames, or any data generated by the CPU1 310, the CPU2 320, the GPU 330, and the DSP/NPU 340 for generating and presenting an image of a view of an artificial reality. According to the mapping information 375, corresponding content data 372 can be identified and accessed. For example, the GPU 330 can generate an image frame of a view of an artificial reality and store the image frame by the shared physical memory 370. The mapping information 375 may indicate the address of the shared physical memory 370 storing the image frame. Then, the DSP/NPU 340 may access the image frame of the view of the artificial reality according to the mapping information, and perform image enhancing processes (e.g., super resolution, artifact removal, etc.) on the image frame. Other components may store and share data in a similar manner without copying or replicating data in one memory device to another memory device. By obviating separate memory devices for different memory devices and copying content from one memory device to another memory device, the CPU1 310, the CPU2 320, the GPU 330, and the DSP/NPU 340 may share the shared physical memory 370 to conserve communication among the CPU1 310, the CPU2 320, the GPU 330, and the DSP/NPU 340 and storage resources.

Figure 4:
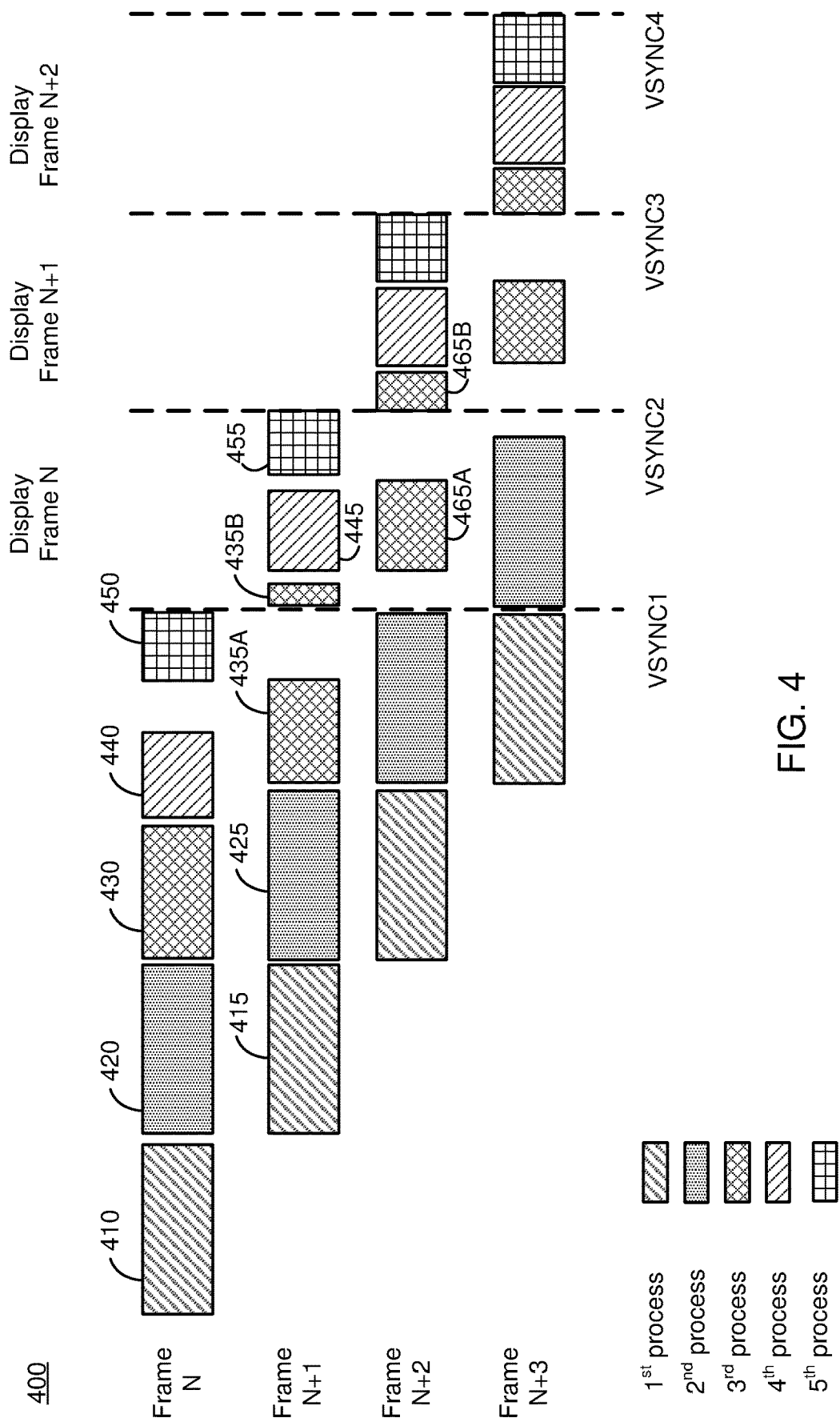
FIG. 4 is a timing diagram of pipelining various processes performed for rendering image frames for artificial reality, according to an example implementation of the present disclosure.

FIG. 4 is a timing diagram 400 of a way of pipelining various processes performed for rendering image frames for artificial reality, according to an example implementation of the present disclosure. In FIG. 4, and by way of illustration, four image frames, Frame N, Frame N+1, Frame N+2, Frame N+3 of an artificial realty are rendered periodically (e.g., every 11 ms). For example, the Frame N is displayed during a frame time between VSYNC1 and VSYNC2, the Frame N+1 is displayed during a frame time between VSYNC2 and VSYNC3, the Frame N+2 is displayed during a frame time between VSYNC3 and VSYNC4, and the Frame N+3 is displayed during a frame time after VSYNC4. In one aspect, the pipeline controller 360 schedules different processes among a first processor (e.g., the CPU1 310), a second processor (e.g., the CPU2 320), a third processor (e.g., the GPU 330), a fourth processor (e.g., the DSP/NPU 340) of a device (e.g., the HMD 150, or other personal/smart device) in a pipelined configuration, such that the image frames Frame N, Frame N+1, Frame N+2, Frame N+3 can be rendered and presented at corresponding VSYNCs.

For processing the Frame N, in one example, the pipeline controller 360 schedules the first processor to perform first processes to handle input commands and estimate a view of an artificial reality for the image frame N during a time period 410, and schedules the second processor to perform second processes to generate commands for rendering for the Frame N during a time period 420. The pipeline controller 360 may also schedule the third processor to perform third processes for graphics rendering according to the commands from the second processor for the frame N during a time period 430. The pipeline controller 360 may also schedule the fourth processor to perform fourth processes (e.g., image enhancing processes such as super resolution, artifact removal, etc.) with a neural network for the Frame N during a time period 440, and schedule the third processor to perform fifth processes for the Frame N for rendering and displaying during a time period 450.

In one example, the pipeline controller 360 may also schedule the first processor, the second processor, the third processor, the fourth processor to perform processes for the Frame N+1 during time periods 415, 425, 435A, 435B, 445, 455 that may wholly or partially overlap with some of the time periods 410, 420, 430, 440, 450 for the Frame N. In one example, the pipeline controller 360 schedules the first processor to perform first processes to handle input commands and estimate a view of an artificial reality for the Frame N+1 during a time period 415 partially or wholly overlapping the time period 420, and schedules the second processor to perform second processes to generate commands for rendering for Frame N+1 during a time period 425 partially or wholly overlapping the time period 430. The pipeline controller 360 may also schedule the third processor to perform third processes for graphics rendering according to the commands from the second processor for the Frame N+1 during time periods 435A, 435B. The time period 435A may partially or wholly overlap with the time period 440. Between the time periods 435A, 435B, the pipeline controller 360 may schedule the third processor to perform fifth processes for the Frame N for rendering and displaying during the time period 450. The pipeline controller 360 may schedule the fourth processor to perform fourth processes (e.g., image enhancing processes) for improving or modifying the Frame N+1 during a time period 445 after the time period 435B, and schedule the third processor to perform fifth processes for the Frame N+1 for rendering and displaying during a time period 455 after the time period 445. The pipeline controller 360 may schedule processes among the first processor, the second processor, the third processor, the fourth processor for other Frames N+2 and Frames N+3 in a similar manner as shown in FIG. 4. Hence, the detailed description thereof is omitted herein for the sake of brevity.

In one example, the pipeline controller 360 schedules the processes among the first processor, the second processor, the third processor, the fourth processor according to the priorities or rankings of the processes within a frame time (e.g., of 11 ms or less). For example, the pipeline controller 360 may prioritize the fifth processes (e.g., reprojection and/or predistortion) for rendering Frame N over the third processes (e.g., tiling, shading and/or rasterizing) for graphics rendering of Frame N+1 according to the commands from the second processor, such that the Frame N can be presented at the VSYNC1. Hence, the time period 450 is reserved or allocated to the third processor to perform fifth processes (e.g., reprojection and/or predistortion) for rendering and displaying Frame N before the VSYNC1, even though the third processor may not have completed the third processes (e.g., tiling, shading and/or rasterizing) for the Frame N+1 during the time period 435A. After the third processor completes the fifth processes (e.g., reprojection and/or predistortion) for rendering and displaying Frame N, the third processor may resume and complete the third processes (e.g., tiling, shading and/or rasterizing) for the Frame N+1 during the time period 435B. Similarly, the time period 455 can be reserved or allocated to the third processor to perform fifth processes (e.g., reprojection and/or predistortion) for rendering and displaying Frame N+1 before the VSYNC2, even though the third processor may not have completed the third processes (e.g., tiling, shading and/or rasterizing) for the Frame N+2 during the time period 465A. After the third processor completes the fifth processes (e.g., reprojection and/or predistortion) for rendering and displaying Frame N+1, the third processor may resume and complete the third processes (e.g., tiling, shading and/or rasterizing) for the Frame N+2 during the time period 465B.

Figure 5:
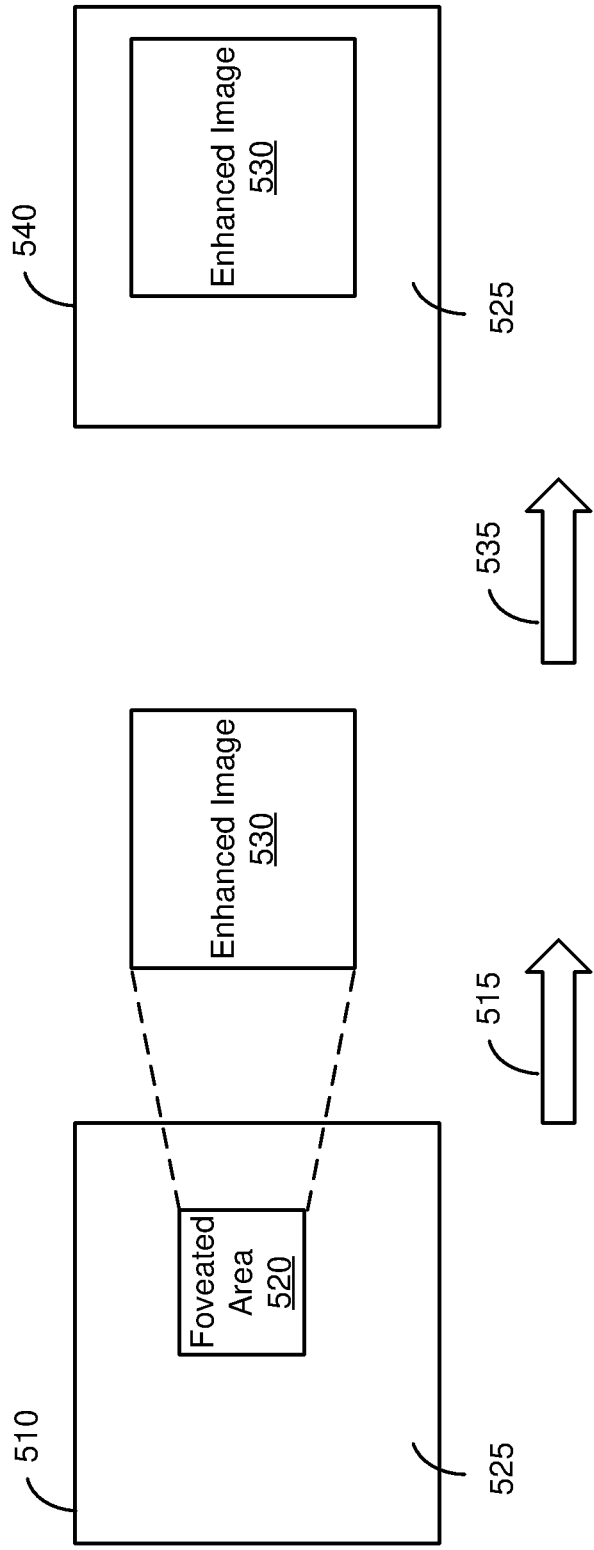
FIG. 5 is an example of super resolution performed by a neural network, according to an example implementation of the present disclosure.

FIG. 5 is an example of super resolution performed by a neural network, according to an example implementation of the present disclosure. In one example, the GPU 330 generates the image frame 510 of a view of the artificial reality corresponding to the estimation of the location and the orientation of the HMD 150, and/or a gaze direction of a user of the HMD 150. The GPU 330 may receive information indicating a foveated area 520 according to the estimation of the gaze direction of the user of the HMD 150. The foveated area 520 may be a predetermined region of an image frame, or may be adaptively determined according to the gaze direction of the user. The foveated area 520 may have a higher resolution than the non-foveated area 525. The GPU 330 may compare a size of the foveated area 520 against a threshold to adaptively change a format of data or files processed. In response to the size of the foveated area 520 being less than the threshold, the GPU 330 may generate the image frame or the portion of the image frame in the second format (e.g., linear format) that the DSP/NPU 340 can process. In response to the size of the foveated area 520 being larger than a threshold, the GPU 330 may generate the image frame or the portion of the image frame in the first format (e.g., swizzled format) that the DSP/NPU 340 may not process. In one approach, a converter of the HMD 150 can convert the image frame or the portion of the image frame in the first format into the second format.

In one example, the DSP/NPU 340 performs super resolution 515 on the foveated area 520. The DSP/NPU 340 may perform super resolution on the foveated area 520 of the image frame via a neural network to increase a size or a number of pixels in the foveated area. For example, the neural network may perform convolutions on the foveated area to increase the size or the number of pixels in the foveated area 520 to obtain an enhanced image 530. In one example, the DSP/NPU 340 may perform blending 535 such that boundaries or edges of the enhanced image 530 can be blended with the non-foveated area 525 to obtain an enhanced image frame 540. By employing a neural network with the DSP/NPU 340, specialized processes such as super resolution can be performed for instance three to ten times faster than with the GPU or other components. Hence, an enhanced image can be presented to the user within a frame time.

Figure 6:
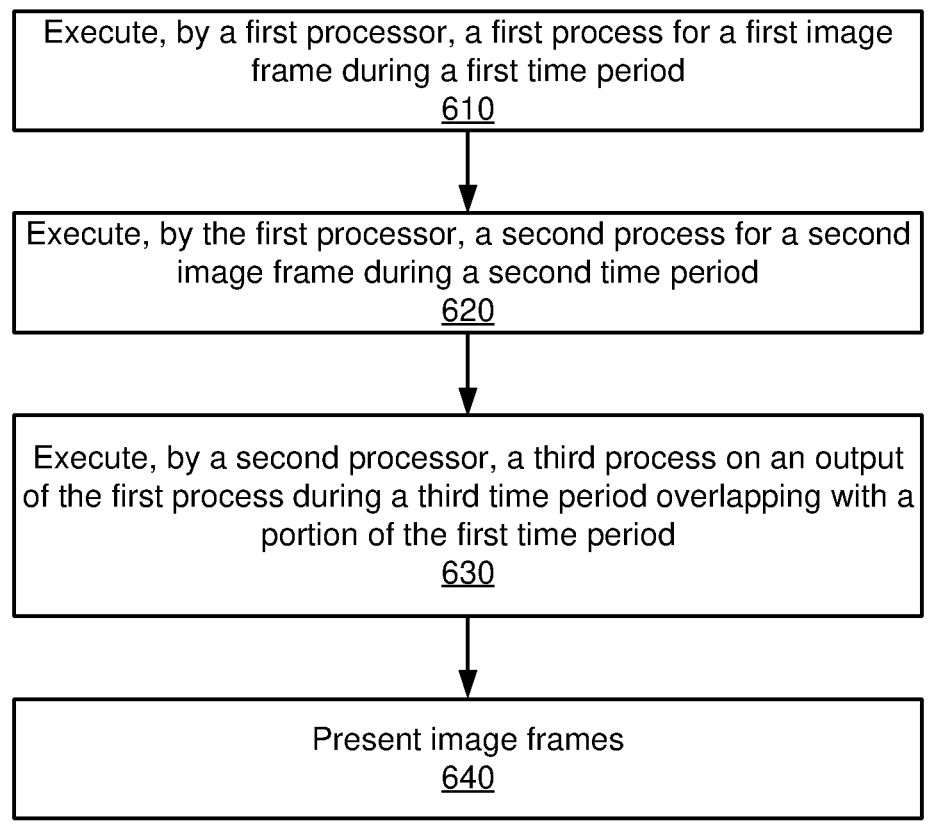
FIG. 6 is a flow chart illustrating a process of rendering an image of an artificial reality through pipelining, according to an example implementation of the present disclosure.

FIG. 6 is a flow chart illustrating a process 600 of rendering an image of an artificial reality through pipelining, according to an example implementation of the present disclosure. In some embodiments, the process 600 is performed by the HMD 150. In some embodiments, the process 600 is performed by other entities. In some embodiments, the process 600 includes more, fewer, or different steps than shown in FIG. 6.

In one approach, the HMD 150 executes 610, using a first processor, a first process for a first image frame during a first time period. For example, the CPU1 310 performs processes to handle input commands and estimate a view of an artificial reality for the first image frame according to a location and an orientation of the HMD 150, and/or a gaze direction of a user of the HMD 150. The CPU2 320 may perform processes to generate commands for rendering for the first image frame. The GPU 330 may perform rendering processes for graphics rendering (e.g., tiling, shading, and/or rasterizing) according to the commands from the CPU2 320 to generate the first image frame during the first time period (e.g., time period 430).

In one approach, the HMD 150 executes 620, using the first processor, a second process for a second image frame during a second time period. For example, the CPU1 310 performs processes to handle input commands and estimate a view of an artificial reality for the second image frame, and the CPU2 320 performs processes (e.g., generate commands) for rendering for the second image frame. The GPU 330 may perform rendering processes for graphics rendering (e.g., tiling, shading, and/or rasterizing) according to the commands from the CPU2 320 to generate the second image frame during the second time period (e.g., time period 435A).

In one approach, the HMD 150 executes 630, using a second processor, a third process on an output of the first process during a third time period to generate a first modified image frame. The second processor may include a neural network that can perform a specialized process (e.g., image enhancing processes such as super resolution, artifact removal, etc.) faster and more efficiently than other components (e.g., CPU or GPU). The third time period may partially or wholly overlap with the first time period. For example, the DSP/NPU 340 performs specialized processes (e.g., super resolution) with a neural network on a portion of the first image frame during the third time period (e.g., time period 440). In one aspect, the second processor is configured to begin, prior to or when the first processor performs the second process on the second image frame, a super resolution on a portion of the first image frame to generate a first modified image frame.

In one approach, the HMD 150 presents 640 image frames. The GPU 330 may perform, during a fourth time period after the second time period, additional processes for rendering according to an update on the location and the orientation of the HMD 150 and/or a gaze direction of the user of the HMD 150. For example, the GPU 330, the CPU1 310, or the CPU2 320 may determine an updated view of the artificial reality according to the updated location and the orientation of the HMD 150, and/or a gaze direction of the user of the HMD 150. In one example, determining a view includes or refers to computing or generating one or more matrices describing an updated location and/or orientation (e.g., an updated view) of the artificial reality or system. In some embodiments, determining a view includes or corresponds to rendering an image frame or generating an image frame. The GPU 330 may perform, during the fourth time period before the VSYNC, reprojection on the first modified image frame from the DSP/NPU 340 to generate an output image frame corresponding to the updated view of the artificial reality. The GPU 330 may also perform during the fourth time period, a predistortion to compensate for any distortion or optical aberrations due to the lens of the HMD 150. The HMD 150 may present the output image frame through an electronic display. In one aspect, the HMD 150 may perform similar processes for subsequent image frames in a pipeline manner as described above with respect to FIGS. 3 and 4, such that one component may perform processing for an image frame, while another component may perform processing for a subsequent image frame. Accordingly, high quality image frames (e.g., 1920 by 1080 pixels, or 3840 by 2160 pixels) in response to a user movement can be generated and presented in a short time period (e.g., less than 11 ms).

Figure 7:
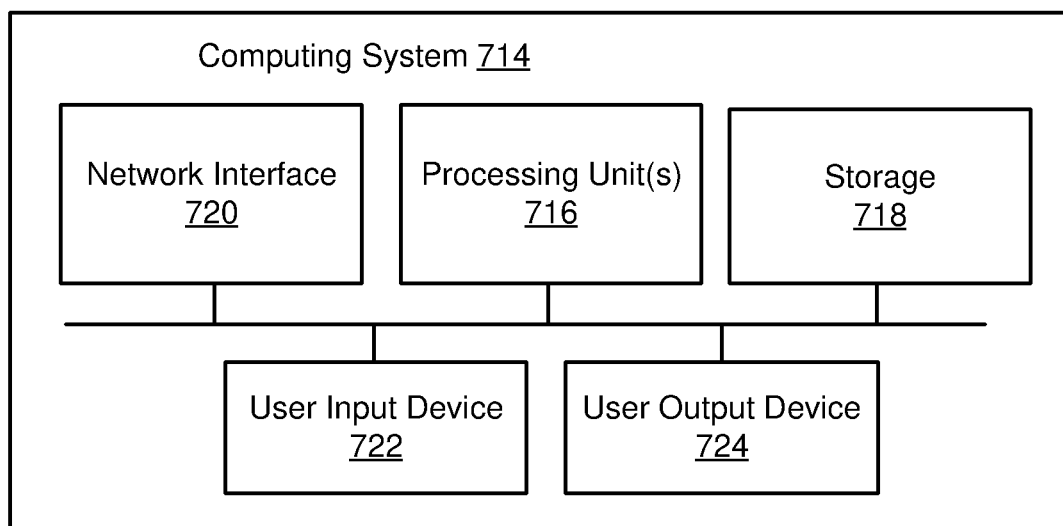
FIG. 7 is a block diagram of a computing environment according to an example implementation of the present disclosure.

Various operations described herein can be implemented on computer systems. FIG. 7 shows a block diagram of a representative computing system 714 usable to implement the present disclosure. In some embodiments, the console 110, the HMD 150 or both of FIG. 1 are implemented by the computing system 714. Computing system 714 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 714 can be implemented to provide VR, AR, MR experience. In some embodiments, the computing system 714 can include conventional computer components such as processors 716, storage device 718, network interface 720, user input device 722, and user output device 724.

Network interface 720 can provide a connection to a wide area network (e.g., the Internet) to which WAN interface of a remote server system is also connected. Network interface 720 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 722 can include any device (or devices) via which a user can provide signals to computing system 714; computing system 714 can interpret the signals as indicative of particular user requests or information. User input device 722 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 724 can include any device via which computing system 714 can provide information to a user. For example, user output device 724 can include a display to display images generated by or delivered to computing system 714. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 724 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 716 can provide various functionality for computing system 714, including any of the functionality described herein as being performed by a server or client, or other functionality associated with message management services.

It will be appreciated that computing system 714 is illustrative and that variations and modifications are possible. Computer systems used in connection with the present disclosure can have other capabilities not specifically described here. Further, while computing system 714 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system comprising:
a shared physical memory;
a first processor having access to the shared physical memory, the first processor configured to:
    perform, during a first time period, a first rendering process to generate a first image frame of a first view of an artificial reality, and
    perform, during a second time period after the first time period, a second rendering process to generate a second image frame of a second view of the artificial reality; and
a second processor including a neural network and having access to the shared physical memory, the second processor configured to perform, during a third time period overlapping a portion of the second time period, an image enhancing process on the first image frame to generate a first modified image frame.

2. The system of claim 1, wherein the first processor is a graphics processor, and the second processor is a digital signal processor or a neural processor.

3. The system of claim 1, wherein the first processor is configured to:
    perform, during a fourth time period after the second time period, reprojection on the first modified image frame to generate a first reprojected image frame, according to a view of the artificial reality corresponding to at least a location and an orientation of the system.

4. The system of claim 3, further comprising:
a lens, wherein the first processor is configured to apply, during the fourth time period, a predistortion on the first reprojected image frame to generate a first compensated image frame to compensate for an optical aberration due to the lens; and
an electronic display configured to display the first compensated image frame through the lens.

5. The system of claim 1, further comprising:
a third processor configured to:
    determine, during a fourth time period before the first time period, the first view of the artificial reality corresponding to at least a first location and a first orientation of the system, and
    determine, during a fifth time period overlapping a portion of the first time period, the second view of the artificial reality corresponding to at least a second location and a second orientation of the system.

6. The system of claim 1, wherein the image enhancing process includes a super resolution, and the second processor is configured to perform, during the third time period, the super resolution on a portion of the first image frame by enlarging the portion of the first image frame.

7. The system of claim 6, wherein the portion of the first image frame corresponds to a foveated area.

8. The system of claim 7, wherein the first processor is configured to generate the first image frame in a linear format, in response to a size of the foveated area being less than a threshold.

9. The system of claim 7, wherein the first processor is configured to generate the first image frame in a swizzled format, in response to a size of the foveated area being larger than a threshold, the system further comprising a converter configured to convert the first image frame in the swizzled format into a linear format.

10. The system of claim 1, wherein the first processor is configured to store the first image frame in the shared physical memory and share mapping information indicating an address of the shared physical memory storing the first image frame, and the second processor is configured to access the first image frame in the shared physical memory according to the mapping information.

11. A method comprising:
performing, during a first time period, by a first processor having access to a shared physical memory, a first rendering process to generate a first image frame of a first view of an artificial reality;
performing, during a second time period after the first time period, by the first processor, a second rendering process to generate a second image frame of a second view of the artificial reality; and
performing, during a third time period overlapping a portion of the second time period, by a second processor having access to the shared physical memory and including a neural network, an image enhancing process on the first image frame to generate a first modified image frame.

12. The method of claim 11, wherein the first processor is a graphics processor, and the second processor is a digital signal processor or a neural processor.

13. The method of claim 11, further comprising:
performing, during a fourth time period after the second time period, by the first processor, reprojection on the first modified image frame to generate a first reprojected image frame, according to a view of the artificial reality corresponding to at least a location and an orientation of a head mounted display worn by a user of the artificial reality.

14. The method of claim 13, further comprising:
applying, during the fourth time period, by the first processor, a predistortion on the first reprojected image frame to generate a first compensated image frame to compensate for an optical aberration due to a lens; and
displaying, by an electronic display through the lens, the first compensated image frame.

15. The method of claim 11, further comprising:
determining, during a fourth time period before the first time period, by a third processor, the first view of the artificial reality corresponding to at least a first location and a first orientation of a head mounted display; and
determining, during a fifth time period overlapping a portion of the first time period, by the third processor, the second view of the artificial reality corresponding to at least a second location and a second orientation of the head mounted display.

16. The method of claim 11, wherein the image enhancing process includes a super resolution, the method further comprising performing, during the third time period, the super resolution on a portion of the first image frame to enlarge the portion of the first image frame.

17. The method of claim 16, wherein the portion of the first image frame corresponds to a foveated area.

18. The method of claim 17, further comprising:
comparing a size of the foveated area against a threshold; and
generating, by the first processor, the first image frame in a linear format, in response to the size of the foveated area being less than the threshold.

19. The method of claim 17, further comprising:
comparing a size of the foveated area against a threshold;
generating, by the first processor, the first image frame in a swizzled format, in response to the size of the foveated area being larger than the threshold; and
converting, by a converter, the first image frame in the swizzled format into a linear format.

20. A system comprising:
a first processor having access to a shared physical memory, the first processor configured to:
    perform, during a first time period, a first rendering process to generate a first image frame of a first view of an artificial reality, and
    perform, during a second time period after the first time period, a second rendering process to generate a second image frame of a second view of the artificial reality; and
a second processor including a neural network and having access to the shared physical memory, the second processor configured to begin, prior to or when the first processor performs the second rendering process to generate the second image frame of the second view of the artificial reality, an image enhancing process on the first image frame to generate a first modified image frame.

* * * * *